US010330824B2

(12) United States Patent
Massonnat

(10) Patent No.: US 10,330,824 B2
(45) Date of Patent: Jun. 25, 2019

(54) METHOD FOR RESTORING WELLBORE DATA

(71) Applicant: TOTAL SA, Courbevoie (FR)

(72) Inventor: Gérard Massonnat, Pau (FR)

(73) Assignee: TOTAL SA, Courbevoie (FR)

( * ) Notice: Subject to any disclaimer, the term of this patent is extended or adjusted under 35 U.S.C. 154(b) by 495 days.

(21) Appl. No.: 14/419,862

(22) PCT Filed: Aug. 6, 2013

(86) PCT No.: PCT/FR2013/051893
§ 371 (c)(1),
(2) Date: Feb. 5, 2015

(87) PCT Pub. No.: WO2014/023910
PCT Pub. Date: Feb. 13, 2014

(65) Prior Publication Data
US 2015/0212234 A1 Jul. 30, 2015

(30) Foreign Application Priority Data
Aug. 6, 2012 (FR) ...................................... 12 57648

(51) Int. Cl.
*G01V 1/40* (2006.01)
*G01V 99/00* (2009.01)

(52) U.S. Cl.
CPC .............. *G01V 99/005* (2013.01); *G01V 1/40* (2013.01)

(58) Field of Classification Search
None
See application file for complete search history.

(56) References Cited

U.S. PATENT DOCUMENTS 6,374,185 B1 * 4/2002 Taner .................... G01V 1/282
367/73
2006/0074825 A1 * 4/2006 Mirowski ................ G01V 1/30
706/20

(Continued)

FOREIGN PATENT DOCUMENTS

EP 2 110 686 A1 10/2009

OTHER PUBLICATIONS

Etchecopar, A., and Bonnetain, J-L., "Cross Sections from Dipmeter Data" The American Association of Petroleum Geologists Bulletin v. 76, No. 5 (1992) p. 621-637.*

(Continued)

*Primary Examiner* — Rehana Perveen
*Assistant Examiner* — Steven W Crabb
(74) *Attorney, Agent, or Firm* — Patterson Thuente Pederson, P.A.

(57) ABSTRACT

The present invention relates to the processing of well data obtained from a completed wellbore. This processing comprises receiving initial well data comprising at least one lithologic segment, each segment representing a lithologic layer each of which comprises a line of inclination or a surface of inclination. This processing furthermore comprises converting the initial well data into restored well data; and delivering the restored well data. The conversion of the initial well data comprises, for each lithologic segment, projecting said lithologic segment onto a normal to the line of inclination or to the surface of inclination to form a projected lithologic segment, and the concatenation of at least one projected lithologic segment to form restored well data.

9 Claims, 6 Drawing Sheets

(56) References Cited

U.S. PATENT DOCUMENTS

| | | |
|---|---|---|
| 2008/0239871 A1 | 10/2008 | Thevoux-Chabuel |
| 2009/0265152 A1 | 10/2009 | Cacas et al. |
| 2011/0282634 A1 | 11/2011 | Marza et al. |
| 2012/0029828 A1* | 2/2012 | Pepper .................... G06F 17/50 702/16 |

OTHER PUBLICATIONS

International Search Report and Written Opinion for PCT/FR2013/051893, dated Mar. 25, 2014, 10 pages.
English translation of International Search Report and Written Opinion for PCT/FR2013/051893, dated Mar. 25, 2014, 10 pages.

\* cited by examiner

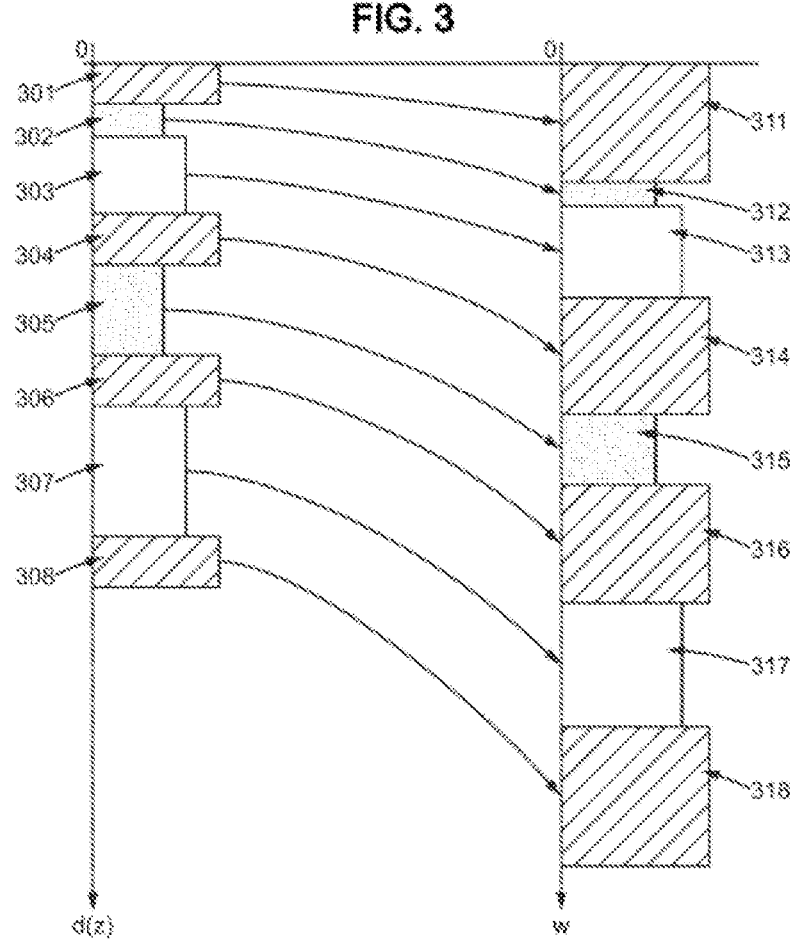

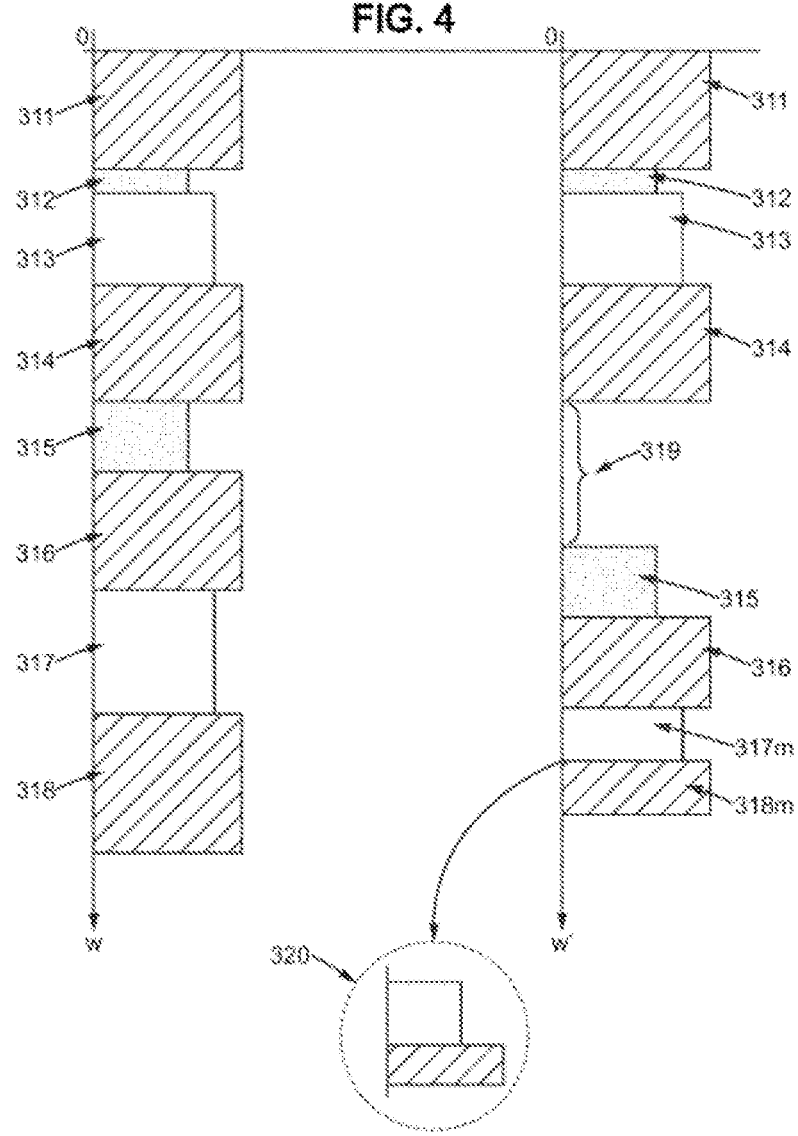

METHOD FOR RESTORING WELLBORE DATA

RELATED APPLICATIONS

The present application is a National Phase entry of PCT Application No. PCT/FR2013/051893, filed Aug. 6, 2013, which claims priority from French Patent Application No. 12 57648, filed Aug. 6, 2012, said applications being hereby incorporated by reference herein in their entirety.

FIELD OF THE INVENTION

The present invention relates to the field of analyzing data from wellbores and notably the field of the preprocessing operations performed on these data in order to allow for an easier analysis.

BACKGROUND OF THE INVENTION

In order to facilitate hydrocarbon prospecting, it can be useful to know the geological structure of the soil to be prospected at the time of drilling. To this end, prospecting drillings are more often than not carried out and the lithological nature of the rocks is recorded along the wellbore. This recording is made using core samples taken from said well. This recording can form part of the data called "well data".

The knowledge of a plurality of well data, and the comparison between wells of these data enables the geologists to best determine the zones that have made it possible, for example, to capture hydrocarbons. Such zones are called "reservoirs".

This comparison made between a first well and a second well can consist in associating each lithological layer of the first well with a lithological layer of the second well. Thus, it is possible to fill in the knowledge blanks between these two wells by considering, for example, that the lithological layer extends linearly from a lithological layer of the first well to the associated lithological layer of the second well.

However, the well data do not always simply allow such an association. In effect, with time, it is possible for the sedimentary layers deposited to be compacted or be deformed under the effect of seismic or tectonic forces. Furthermore, the erosion of the soils can also make certain sedimentary layers disappear in certain wells. Finally, the wells are not necessary vertical and can exhibit a certain deviation, a deviation that is potentially different between distinct wells.

Examples or possible embodiments from the prior art are described in the document US 2011/282634 A1.

There is thus a need to simplify the reading of the well data in order to be able to more simply identify the associations between lithological layers of distinct wells.

The present invention improves the situation.

SUMMARY OF THE INVENTION

To this end, the present invention proposes processing the well data in order to enable the geologists, for example, to associate the lithological layers in a simple manner.

The object of the present invention is then a method for processing well data from a wellbore performed by a circuit.

The method comprises the steps of:
receiving initial well data, the initial well data comprising at least one lithological segment, each segment representing a lithological layer each comprising a line of inclination or a surface of inclination;
transforming the initial well data into restored well data; and
supplying the restored well data.

The transformation of the initial well data comprises:
for each lithological segment, projection of said lithological segment onto a normal to the line of inclination or to the surface of inclination at an intersection between the lithological segment and the line of inclination or the surface of inclination to form a projected lithological segment;
concatenation of the at least one projected lithological segment to form restored well data.

The term "initial well data" is used to mean the lithological information along a well. Such information makes it possible to know the make-up of the sub-soil over the path of the wellbore at the time of drilling. For example, these data can contain information of "limestone rock at 30 m from the well entry" or "granite rock at 31 m from the well entry". These initial well data can also comprise information relating to the form of the well (for example, the coordinates or the equation of the trajectory of the well in space), as well as information relating to the lines (surfaces) of inclination (for example, the coordinates or the equation of the lines or of the surfaces in space).

The term "circuits" is used to mean any electronic module or entity associated or not associated with a memory and making it possible to perform a given method. For example, this circuit can be:
a processor suitable for interpreting instructions described in the form of a computer program, or
an electronic board in which the steps of a method are described in the silicon chip, or even
a programmable electronic chip such as an FPGA (Field-Programmable Gate Array) chip.

The term "lithological segment" is used to mean information relating to the lithological nature of the sub-soil along a well segment. For example, this segment can be "limestone rock over the segment [30 m; 40 m] to be counted from the well entry". This segment then corresponds to the presence of a lithological layer (or even "sedimentary layer" or "stratum") of limestone passed through by the well.

The term "line of inclination" (respectively "surface of inclination") is used to mean the line (respectively the surface) making it possible to represent the overall orientation of the lithological layer. This line (respectively this surface) is more often than not oriented according to "the horizon" on the day of the sedimentation (or "historical horizon"). In effect, the sedimentation phenomena lead more often than not to a deposition of material on planar and horizontal surfaces. In the case of distinguishable lithological layers, the interface between two layers can correspond to this "line of inclination" (respectively "surface of inclination"). These lines of inclination (respectively "surface of inclination") are not necessarily horizontal on the day of drilling: in effect, the sub-soils are subject to deformation forces or shear forces that substantially modify the structure of the soils.

The normal to the line of inclination at an intersection between the lithological segment and the line of inclination then corresponds to the historical vertical (by analogy with the historical horizon).

The term "concatenation of projected segments" is used to describe the operation by which the projected segments obtained are placed end-to-end in order to obtain a "restored" representation of the structure of the sub-soil. This concatenation observes the order of the segments: thus, if the segments of the well are arranged in ascending order according to their distance to the entry of the well, it is possible to arrange the projected segments in this same order. The concatenation will also observe this order. Thus, if the well comprises four points A, B, C and D (in ascending order of distance from the entry of the well) and the well data comprise three segments [A; B], [B; C] and [C; D], the projected segments can be respectively denoted [A'; $B_1$'], [$B_2$'; $C_1$'] and [$C_2$'; D']. The concatenation corresponds to the end-to-end abutment of these segments: thus, the point $B_1$' is matched with the point $B_2$', and the point $C_1$' is matched with the point $C_2$'.

This method therefore makes it possible to normalize the thicknesses of the different lithological layers according to a new scale by doing away with the possible deformations of the subsoil. It is thus easier to compare different data from different wells/drillings by normalizing them according to a similar scale.

Advantageously, the transformation can further comprise, for each lithological segment, the production of an affine proportional transformation of the lithological segment or of the projected lithological segment.

Thus, it is possible to take into account, in the normalization, the compaction of the different sedimentary layers.

In one embodiment of the invention, said segment can represent a lithological layer comprising at least one facies. Thus, the affine proportional transformation can be a function of a decompaction rate associated with said at least one facies.

In effect, the compaction (and therefore the decompaction) can depend on the nature of the lithological layers concerned. For example, a granite rock can be less compressible than clay.

This decompaction factor can also depend on the depth of the layer considered (and therefore the pressure forces exerted on this layer).

Furthermore, the transformation can further comprise an insertion of at least one segment into the concatenation produced.

The insertion of a segment can make it possible to take into account a disappearance of a layer or of a part of a lithological layer (for example, by erosion).

Advantageously, the transformation can further comprise a deletion of at least one non-empty part of a projected lithological segment in the concatenation produced.

The deletion of a part of a lithological segment can make it possible to take into account the presence of faults, as is detailed hereinbelow.

In effect, the insertion or the deletion can be associated with a fault of at least one layer represented by one of the lithological segments.

Furthermore, the insertion can be associated with an erosion of at least one layer represented by one of the lithological segments.

A device can be advantageous, in itself, since it allows for the processing of the initial well data in order to obtain the restored well data.

Thus, another object of the present invention is a device intended for the processing of well data from a wellbore. The device comprises:

an interface for receiving initial well data, the well data comprising at least one lithological segment, each segment representing a lithological layer each comprising a line of inclination or a surface of inclination;

a circuit for transforming the initial well data into restored well data; and an interface for supplying the restored well data.

The circuit for transforming the initial well data is suitable for:

for each lithological segment, projecting said lithological segment onto a normal to the line of inclination or to the surface of inclination at an intersection between the lithological segment and the line of inclination or the surface of inclination to form a projected lithological segment;

concatenating at least one projected lithological segment to form restored well data.

The transformation circuit can be, for example:

a processor suitable for interpreting instructions described in the form of a computer program, or an electronic board in which the steps of a method are described in the silicon chip, or even a programmable electronic chip such as an FPGA (Field-Programmable Gate Array) chip.

A computer program, implementing all or part of the method described above, installed on pre-existing equipment, is in itself advantageous, since it makes it possible to process the initial well data in order to obtain the restored well data.

Thus, another object of the present invention is a computer program comprising instructions for implementing the method described previously, when this program is executed by a processor.

FIG. 6 described in detail hereinbelow can form the flow diagram of the general algorithm of such a computer program.

Other features and advantages of the invention will become more apparent on reading the following description. This is purely illustrative and should be read in light of the attached drawings in which:

BRIEF DESCRIPTION OF THE DRAWINGS

FIG. 3 illustrates a decompaction of lithological segments in one embodiment of the invention;

FIG. 4 illustrates an insertion of segments and a deletion of parts of lithological segments in one embodiment of the invention;

DETAILED DESCRIPTION OF THE DRAWINGS

Figure 1:
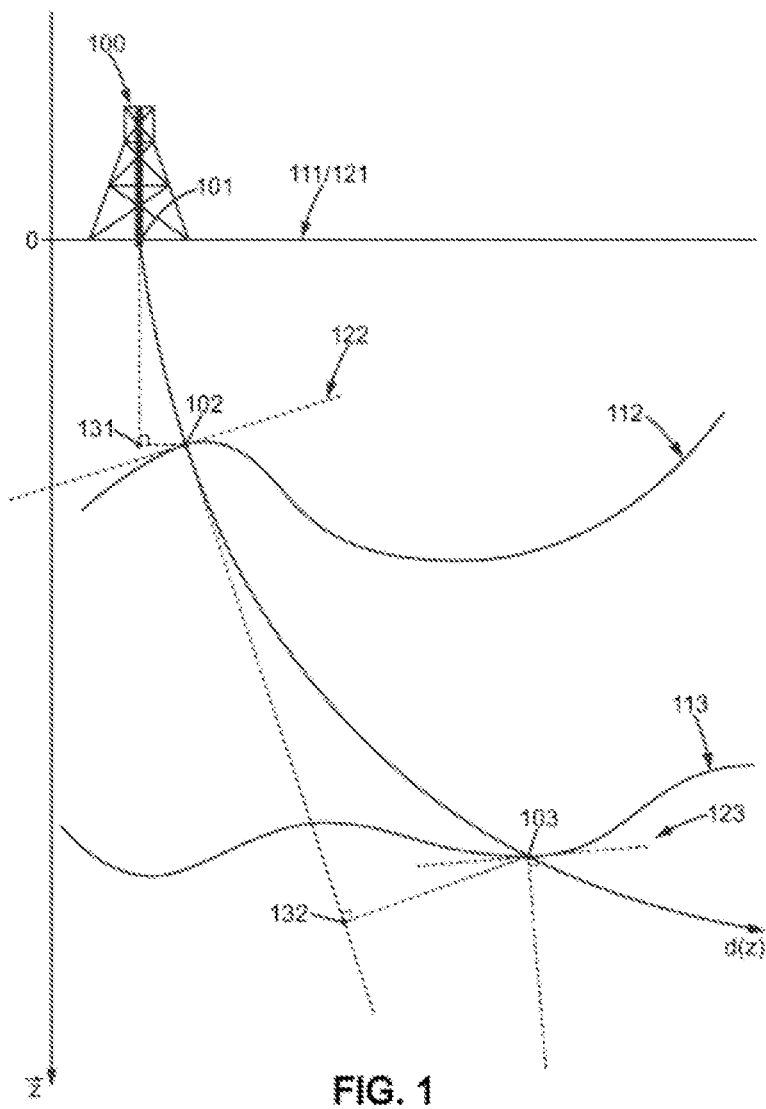
FIG. 1 illustrates a possible projection of the lithological segments in a particular embodiment of the invention.

FIG. 1 illustrates a possible projection of the lithological segments in a particular embodiment of the invention.

At the time of drilling (100), the well produced can be vertical, but it can also be deflected. In the example of FIG. 1, the well is deflected and corresponds to the curved line passing through the points 101, 102 and 103.

From this well, it is possible to remove core samples that provide precious information concerning the types of rocks encountered and relating to their position. This position is known in relation to the distance in the well (i.e. d(z)) by recording the length of the core samples taken from the ground.

The geologists can project the information obtained above onto a vertical axis z and thus obtain the nature of the rocks as a function of the depth (and not as a function of the distance in the well).

FIG. 1 shows three "historical horizons" (also called "lines of inclination"):

a line of inclination at the ground level 111, two underground lines of inclination 112 and 113.

The term "historical horizon" is used to mean the actual horizontal line or surface at the time of the sedimentation or of the precipitation of a lithological layer being considered. This "historical horizon" can be determined notably by the analysis of the sedimentary layers and notably of the interfaces between these sedimentary layers. In effect, the sediments have a natural tendency to be deposited on the soil by forming a substantially planar and horizontal surface. These interfaces can be called "horizons" by the geologists. Obviously, these interfaces can then be altered under the effect of the erosion of the soils, fractures, faults or tectonic pressures.

In this two-dimensional representation, the horizons are represented by lines. However, in a three-dimensional model, these horizons can be represented by surfaces (then called "surfaces of inclination"). Thus, the teaching of the present document applies without difficulty to a three-dimensional model or to a two-dimensional model: the expression "line of inclination" should be read as meaning "surface of inclination" too.

It can be advantageous to project the well data obtained onto a normal to these lines of inclination (at an intersection between the well and the lines of inclination) in order to know the structure of the sub-soil according to a normalized scale: this projection is called "temporal normalization".

By way of illustration, the tangent 121 to the curve 111 at the point 101 makes it possible to determine this normal. Thus, the line passing through the points 101 and 131 is the normal to the line of inclination 111 at the point 101. Consequently, it is possible to obtain the projection of the well data onto this normal: this projection corresponds to the segment [101-131]. This projection corresponds geometrically to the orthonormal projection of the curved segment 101-102 of the well onto the straight line [101-131].

The tangent 122 to the curve 112 at the point 102 makes it possible to determine this normal. Thus, the line passing through the points 102 and 132 is the normal to the line of inclination 112 at the point 102. Consequently, it is possible to obtain the projection of the well data onto this normal: this projection corresponds to the segment [102-132]. This projection corresponds geometrically to the orthonormal projection of the curved segment [102-103] of the well onto the straight line [102-132].

Of course, a large number of lines of inclination can be defined. This number can notably be a function of the capacity to determine the interfaces between sedimentary layers of the subsoil. It is also possible to define intermediate lines of inclination between a known first line of inclination and a second line of inclination that is also known: this determination can be performed by interpolation, or even by dichotomy along a vertical axis cutting the two lines of inclination.

Figure 2A:
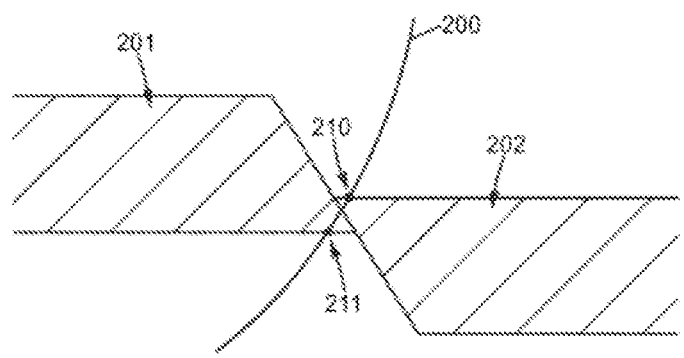
FIGS. 2a and 2c illustrate drillings in the case of a normal fault.

FIG. 2a illustrates a well 200 in the case of a normal fault. In effect, in this illustration, the subsoil has been subjected to shear forces. A normal fault has then been created, cutting a lithological layer (shaded layer) into two parts 201 and 202.

In the case of a well 200 (the trajectory of which is represented by the oblique curve of FIG. 2a), it is possible to observe that the thickness "perceived" by such a well of the shaded lithological layer does not conform to the sedimentary reality. In effect, the "perceived" thickness of the shaded layer corresponds to the norm of the lithological segment [210; 211]. This segment is substantially shorter than that which would have represented the same shaded layer in the absence of a fault.

Figure 2B:
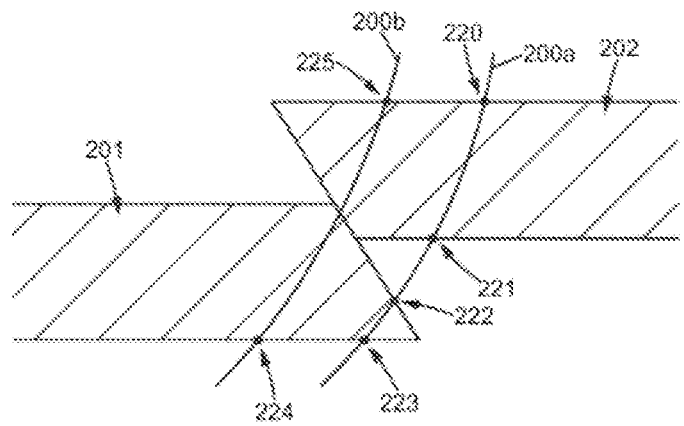
FIGS. 2b and 2d illustrate drillings in the case of an inverse fault.

FIG. 2b illustrates a well 200a and a well 200b in the case of an inverse fault. In effect, in this illustration, the subsoil has been subjected to shear forces. An inverse fault has then been created, cutting the lithological layer (shaded layer) into two parts 201 and 202.

In the case of a well 200b (the trajectory of which is represented by the oblique curve on the left of FIG. 2b), it is possible to observe that the thickness "perceived" by such a well of the shaded lithological layer does not conform to the sedimentary reality. In effect, the lithological segment [225; 224] is substantially longer than that which would have represented the same layer in the absence of a fault.

There can also be, in the configuration of FIG. 2b, situations of "layer splitting": the splitting describes the fact that the well data make a plurality of layers appear although in reality there is only one layer. By way of illustration, in the case of a well 200a (the trajectory of which is represented by the oblique curve on the right of FIG. 2b), it is possible to observe that the shaded lithological layer is represented by two segments [220-221] and [222-223]. This representation does not conform to the sedimentary reality.

Figure 2C:
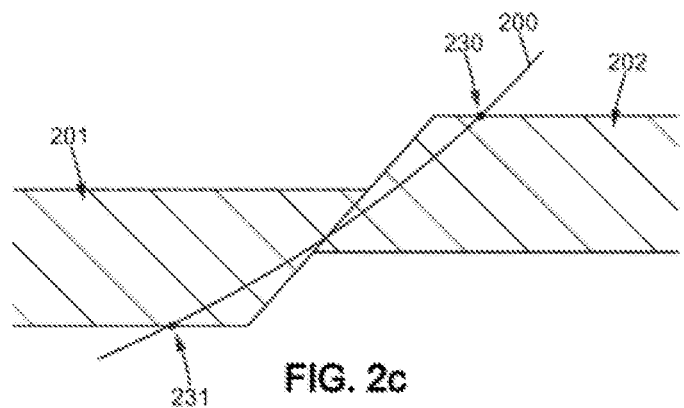

FIG. 2c illustrates a well 200 in the case of a normal fault in a way similar to FIG. 2a.

In the case of the well 200, the trajectory of which is represented by the oblique curve of FIG. 2c, it can be observed that the thickness "perceived" by such a well of the shaded lithological layer does not conform to the sedimentary reality. In effect, the lithological segment corresponding to this shaded layer extends from the point 230 to the point 231. This segment is substantially longer than that which would have represented the same layer, but in the absence of a fault.

A situation of layer splitting presented above is also possible in such a configuration.

Figure 2D:
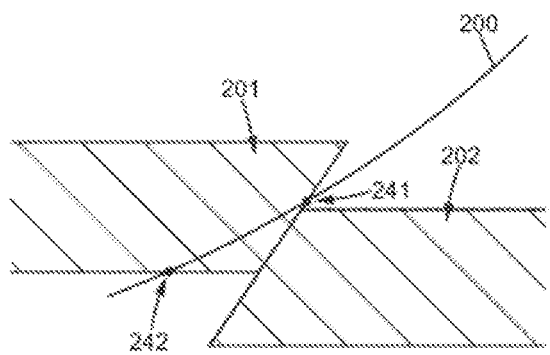

FIG. 2d illustrates a well 200 in the case of an inverse fault in a manner similar to FIG. 2b. In the case of the well 200 (the trajectory of which is represented by the oblique curve of FIG. 2d), it can be observed that the thickness "perceived" by such a well of the shaded lithological layer does not conform to the sedimentary reality. In effect, the lithological segment corresponding to this shaded layer extends from the point 241 to the point 242. This segment is substantially shorter than that which would have represented the same layer, but in the absence of a fault.

FIG. 3 illustrates a decompaction of lithological segments in an embodiment of the invention.

The aim of this "decompaction" is to better normalize the representation of the subsoil by presenting it in a situation as it was upon the sedimentation of the different layers. In effect, certain layers can be compacted in reaction to the pressure forces exerted by the upper layers or by tectonic pressure forces. For example, clay has a strong propensity to be compacted in reaction to the increase in pressure whereas calcite is compacted only very little under the same pressure.

The blocks 301 to 308 represent lithological segments before decompaction. The blocks that have one and the same pattern represent lithological layers of identical facies:

the shaded blocks 301, 304, 306 and 308 represent lithological layers of type 1 facies;

the dotted blocks 302 and 305 represent lithological layers of type 2 facies;

the white blocks 303 and 307 represent lithological layers of type 3 facies;

Upon decompaction, each segment undergoes an affine proportional transformation (i.e. the vertical dimension of the blocks 301 to 308 of FIG. 3 is multiplied by a positive multiplying coefficient called "proportional transformation coefficient"). The multiplying coefficient can depend notably:

on the type of facies of the segment considered, and/or on the depth of the segment considered at the time of drilling, and/or on the pressure exerted by the upper lithological layers on the lithological layer represented by the segment considered.

After proportional transformation, the blocks 301 to 308 are transformed respectively into blocks 311 to 318 (or "decompacted blocks").

FIG. 4 illustrates an insertion of segments and a deletion of parts of lithological segments in an embodiment of the invention.

In this illustration, an empty segment 319 has been inserted between the segments 314 and 315. This insertion can be linked to the knowledge of an erosion corresponding to a lithological layer, the composition of which is still unknown. This insertion can also be linked to the knowledge of a fault, as described in FIGS. 2a and 2d, modifying downward the length of the segments derived from the core samples from the drilling of the well. Thus, it is advantageous to compensate this loss or this modification of the length of the segments by introducing a new segment.

Furthermore, in this illustration, a deletion of one of the segments 317 and 318 has been performed: this deletion is represented by the elements contained in the bubble 320. This deletion can be linked to the knowledge of a fault, as described in FIGS. 2b and 2c, modifying upwards the length of the segments obtained from the core samples from the drilling of the well. The segment 317 (respectively 318) is reduced and then forms a new segment 317m (respectively 318m).

Figure 5:
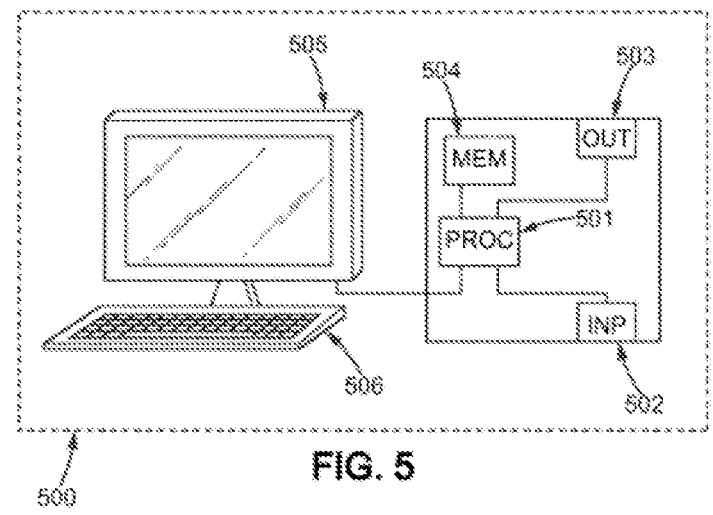
FIG. 5 illustrates a device for processing well data in one embodiment of the invention.

FIG. 5 represents an example of a device 500 for processing well data in one embodiment of the invention.

In this embodiment, the device 500 comprises a computer, comprising a memory 504 for storing instructions making it possible to implement the method described previously, the received well data and temporary data for carrying out the various steps of the method.

The computer further comprises a transformation circuit 501. This transformation circuit can be, for example:

a processor suitable for interpreting instructions described in the form of a computer program, or an electronic board in which the steps of the method of the invention are described in the silicon chip, or even a programmable electronic chip such as an FPGA (Field-Programmable Gate Array) chip.

This computer comprises an input interface 502 for receiving initial well data, and an output interface 503 for supplying restored well data. Finally, the computer comprises, to allow for easy interaction with a user, a screen 505 and a keyboard 506.

Figure 6:
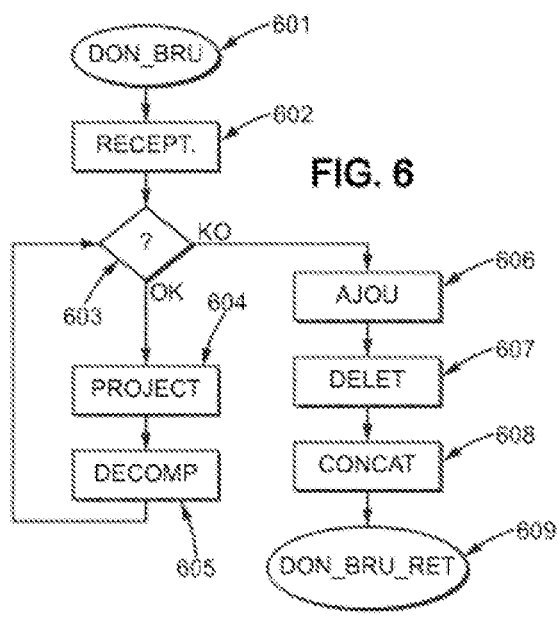
FIG. 6 is an example of a flow diagram of a method implementing certain steps of the invention.

FIG. 6 is an example of a flow diagram of a method implementing certain steps of the invention.

Upon the reception (step 602) of the initial well data (message 601) by the input interface 502, the latter are transmitted to the processor 501 and stored in the memory 504.

This processor 501 then executes a set of instructions described in the form of a computer program in order to process the initial well data received.

In light of these instructions, if a lithological segment contained in the initial data has not yet been processed (OK output from the test 603), then a projection of this segment is performed (step 604) as has been described previously. Furthermore, a decompaction of the projected segment (step 605) can also be performed according to a decompaction method described, for example, by FIG. 3 and by the description associated with this figure.

If all the lithological segments contained in the initial data have been projected then decompacted (KO output from the test 603), then it is possible to add segments (step 606) or delete parts of segments (step 607) to or from the previously determined projected segments.

Finally, the segments obtained can be concatenated (step 608) to obtain restored well data (message 609). These restored well data can be supplied to a third party entity for various processing operations or to be viewed by an operator.

Moreover, the functional diagram presented in FIG. 6 is a typical example of a program in which certain instructions can be performed by the device described. In this respect, FIG. 6 can correspond to the flow diagram of the general algorithm of a computer program within the meaning of the invention.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A method for processing well data from a wellbore performed by a circuit, the method comprising the steps of:

receiving initial well data, the initial well data comprising lithological segments, each segment representing a lithological layer, the well data comprising for each layer a line of inclination or a surface of inclination;

transforming the initial well data into restored well data;

supplying the restored well data; and determining a geological structure of a soil to be prospected based on said supplied restored well data;

wherein the transforming of the initial well data comprises:

for each lithological segment, projection of said lithological segment onto a normal to the line of inclination or to the surface of inclination, the normal passing through an intersection between the lithological segment and the line of inclination or the surface of inclination, to form a projected lithological segment;

concatenation of the projected lithological segment to form restored well data; and wherein the transformation further comprises:

for each lithological segment, production of an affine proportional transformation of the lithological segment or of the projected lithological segment.

2. The method as claimed in claim 1, wherein each lithological segment represents a lithological layer comprising at least one facies, and wherein the affine proportional transformation is a function of a decompaction rate associated with said at least one facies.

3. The method as claimed in claim 1, wherein the transformation further comprises:

insertion of at least one lithological segment into the concatenation produced.

4. The method as claimed in claim 1, wherein the transformation further comprises:

deletion of at least one non-empty part of one projected lithological segment in the concatenation produced.

5. The method as claimed in claim 3, wherein the insertion is associated with a fault of at least one layer represented by one of the lithological segments.

6. The method as claimed in claim 3, wherein the insertion is associated with an erosion of at least one layer represented by one of the lithological segments.

7. A device for processing well data from a wellbore, the device comprising:

an interface for receiving initial well data, the well data comprising lithological segments, each of the lithological segments representing a lithological layer, the well data comprising for each layer a line of inclination or a surface of inclination;

a circuit for transforming the initial well data into restored well data; and an interface for supplying the restored well data and displaying a geological structure of a soil to be prospected based on said supplied restored well data;

wherein the circuit for transforming the initial well data is suitable for:

for each lithological segment, projecting said lithological segment onto a normal to the line of inclination or to the surface of inclination, the normal passing through an intersection between the lithological segment and the line of inclination or the surface of inclination, to form a projected lithological segment;

concatenating the projected lithological segments to form restored well data;

and wherein the circuit for transforming initial well data is suitable for:

for each lithological segment, producing an affine proportional transformation of the lithological segment or of the projected lithological segment.

8. A non-transitory computer readable storage medium, having stored thereon a computer program comprising program instructions, the computer program being loadable into a data-processing unit and adapted to cause the data-processing unit to carry out, when the computer program is run by the data-processing device:

receiving initial well data, the initial well data comprising lithological segments, each segment representing a lithological layer, the well data for each layer comprising a line of inclination or a surface of inclination;

transforming the initial well data into restored well data;

supplying restored well data; and determining a geological structure of a soil to be prospected based on said supplied restored well data;

wherein the transformation of the initial well data comprises:

for each lithological segment, projection of said lithological segment onto a normal to the line of inclination or to the surface of inclination, the normal passing through an intersection between the lithological segment and the line of inclination or the surface of inclination, to form a projected lithological segment;

concatenation of the projected lithological segments to form restored well data;

and wherein the transformation further comprises:

for each lithological segment, production of an affine proportional transformation of the lithological segment or of the projected lithological segment.

9. The method as claimed in claim 4, wherein the deletion is associated with a fault of at least one layer represented by one of the lithological segments.

* * * * *